Sept. 23, 1941.                G. H. COTE                    2,256,611
                              DIE HOLDER
                          Filed April 8, 1940
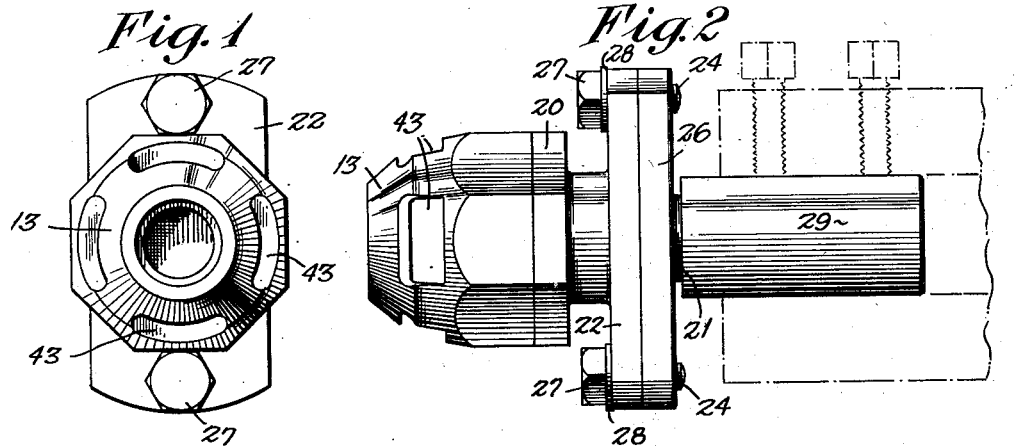
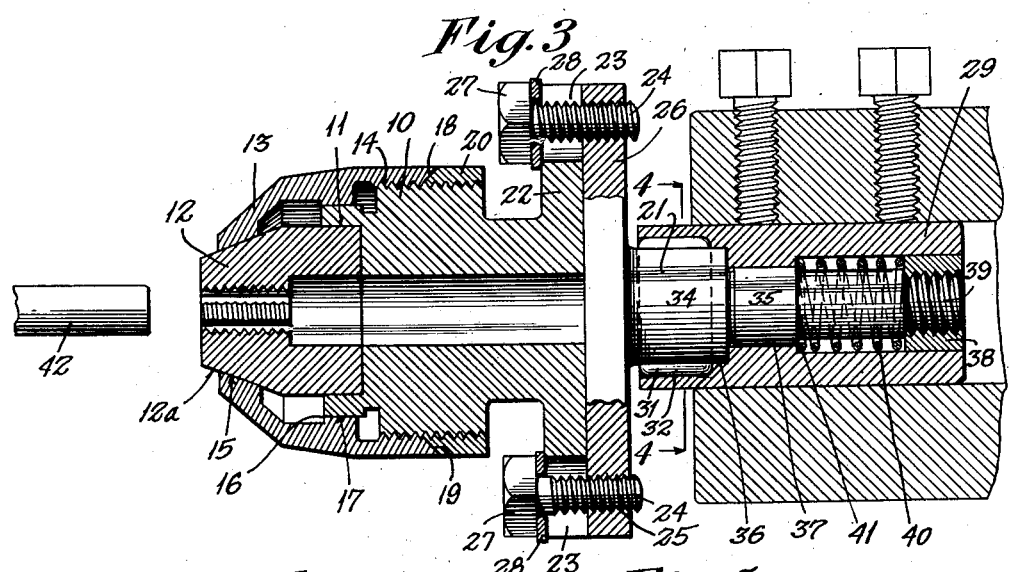
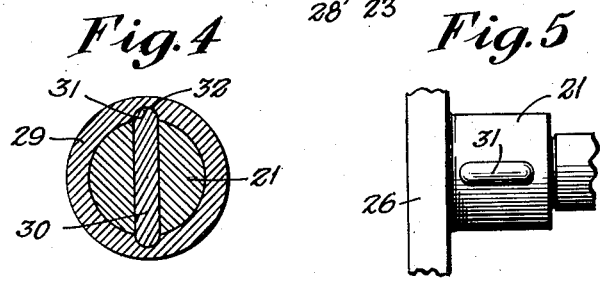
INVENTOR
George H. Cote
BY
Johnson, Kline & Smyth
ATTORNEYS Patented Sept. 23, 1941

2,256,611

UNITED STATES PATENT OFFICE 2,256,611

DIE HOLDER

George H. Cote, Bridgeport, Conn.

Application April 8, 1940, Serial No. 328,422

15 Claims. (Cl. 10—89)

This invention relates to die holders and mountings therefor, and, more particularly, to a holder for a so-called acorn die and the means for mounting the holder to the turret of a machine.

In the previously proposed holders for use with these dies, the die was held by a cap against a seat formed on a head onto which the cap was threaded. The cap was provided with a surface adapted to engage the conical head of the die so that the cap, when threaded back on the head, held the die tightly against the seat of the head. These holders depended solely upon the threaded connection between the head and the cap for holding the die in a true position, and, if the threaded connection was not a tight one, the die, consequently, could not be properly mounted. If the die was not concentric with the axis of rotation, a true and accurate cut could not be made.

In the holder of the present invention, the head is provided with an annular bearing surface which is truly parallel to the axis of the head. An annular bearing surface is also formed on the cap parallel again to the axis of the head to insure that the axis of the cap, when threaded onto the head, coincides with the axis of the head.

The holder of the present invention will, therefore, properly mount the die even though the threads by which the cap is secured to the head are not absolutely true.

To prevent the cap from backing off the head during working movement of the holder, the cap is provided at its inner end with a surface adapted to be engaged by a complementary locking surface formed on a nut threadedly mounted at the rear of the head.

The present invention provides means for adjustably mounting the head of the holder so that the head may be made concentric with the axis of rotation. To this end, the tool-holding head is provided with a flange formed with a pair of slots at diametrically opposite points to receive studs threaded into apertures formed in a flange carried by a shank received with a sleeve carried by the turret or other head of a screw machine or the like. The meeting faces of the flanges are truly perpendicular to the axis of the head so that the head may be adjusted in a plane perpendicular to the axis thereof. As the axis of the head is coincident with the axis of rotation, the head may be adjusted so as to be made concentric with the axis of rotation.

To insure against misalignment of the shank, the shank is formed with a plurality of concentric cylindrical surfaces adapted to slidably engage a like number of concentric annular surfaces formed in the bore of the sleeve. The contact surfaces, as they are of different diameters, hold the shank in accurate alignment with the axis of the sleeve, which coincides with the axis of rotation, over a period longer than would surfaces having the same diameter.

The shank is held against rotational movement relative to the sleeve as the shank is keyed to the sleeve. The key of the present invention comprises a diametrical key carried by the shank having the opposite projecting ends suitably rounded and received within key slots formed at diametrical opposite points in the bore of the sleeve and shaped to receive the rounded projecting ends of the key.

The key of the present invention, as it presents no sharp edges, obviates much of the wear of previously proposed sharp edged keys and thereby reduces friction and wear of the slot.

Other features and advantages will hereinafter appear.

In the accompanying drawing:

Figure 1 is a front view of the die holder.

Fig. 2 is a side view of the holder shown mounted in the turret of the machine.

Fig. 3 is a sectional view of the die holder mounted in the turret of the machine, showing the die in its position on the holder.

Fig. 4 is a sectional view, taken on the line 4—4 of Fig. 3.

Fig. 5 is a fragmentary plan view of the shank of the holder showing one projecting end of my novel key.

The die holder of the present invention comprises a head 10 formed with a seat 11 against which the base of a die 12 is held by a cap 13 threaded onto the head 10. The cap is formed at the outer end thereof with a camming surface 15 adapted to cooperate with a camming surface 12a formed by the conical nose of the die 12 to hold the base of the die tightly on the seat 11 when the cap is threaded onto the head.

The plane of the seat is truly perpendicular to the axis of the head while the plane of the base of the die is perpendicular to the axis of the die. The axis of the die, therefore, when the die is properly mounted on the seat will coincide with the axis of the head.

To insure that the die 12 will be properly held on the seat 11, the head is provided with an annular bearing surface 16 which is truly parallel to the axis of the head which, when the cap is threaded onto the head, engages a similar bearing surface 17 formed interiorly of the cap. The two bearing surfaces cooperate to hold the cap mounted in a true position on the head. This construction will insure that the cap accurately seats the die, even though the threads 14 may be inaccurately cut and there is a tendency for the cap to have a certain play or to be held in misalignment when it is mounted on the head.

It will be seen that the bearing surfaces 16 and 17 are of such a length that they cooperate to maintain the cap accurately mounted within the range of movement of the cap axially of the head during the adjustment of the cap relative to the head.

To prevent the cap from backing off the head during the use of the holder, the cap is undercut at its inner end to provide an angular surface 18 adapted to be engaged by a complementary surface 19 formed on a nut 20 which is also threaded onto the head.

In operation of the holder, the die 12 may be positioned in its seat 11, the cap 13 threaded onto the head to clamp the die tightly against the seat 11 whereupon the nut 20 may be turned up until the surface 19 is tightly clamped against the surface 18 of the cap. This will insure that the cap will not work loose and fail to properly hold the die in its proper position to insure an accurate cut.

To facilitate the attachment of the head to a shank 21, the head is provided with a flange 22 having a pair of slots 23 at diametrically opposite points to receive studs 24 threaded into opertures 25 formed in the flange 26 carried by the shank 21.

It will be seen that, when the studs are threaded into the apertures 25 and the heads 27 thereof engage the washers 28, the head will be securely clamped to the flange 26. The head may be adjusted relative to the axis of rotation of the shank 21 by merely loosening the studs 24 and jogging the flange 22 and then tightening the studs again. This adjustment affords easy means for bringing the head into concentricity with respect to the axis of rotation when the holder is mounted on the turret or tool station of a mahcine.

The holder is mounted or secured to the turret or other head of a screw machine or the like by a sleeve 29 to which the shank 21 is keyed. The key 30, referring now to Fig. 4, is a diametrical one and is received within an ovaloid slot diametrically formed in the shank 21. The oppositely projecting ends of the key are suitably rounded as shown in Figs. 3, 4 and 5 and are received within smoothly curved concave key slots 32 formed in the bore of the sleeve 29.

The improved key of the present invention, as the ends thereof are rounded as at 31 do not, as they ride in the slots 32, dig into the walls of the slots and form ridges therein which would prevent the key from securely locking the shank 21 to the sleeve 29. The rounded ends of the key also reduce friction between the shank and the sleeve as the shank slides in the sleeve.

The axis of the sleeve, as the sleeve is secured in the turret or head of the machine, coincides with the axis of rotation so that the shank when properly aligned will be concentric with the axis of rotation.

To insure against misalignment between the shank 21 and the sleeve 29, the shank is provided with a plurality of concentric contact surfaces 34 and 35 slidably engaging a like number of concentric surfaces 36 and 37 formed in the bore of the sleeve 29.

The concentric sliding contact surfaces tend to hold the shank in alignment for a period of use longer than would surfaces having the same diameter as there is less likelihood of uneven wear occurring between the contacting surfaces.

To hold the shank 21 in the position shown in Fig. 3, a nut 38 is threaded onto a reduced threaded portion 39 of the shank 21, which nut takes the thrust of a coiled compression spring 40 surrounding the shank 21, the opposite end of which engages a shoulder 41 formed internally of the sleeve 29. The spring 40, as it is seated on the shoulder 41, exerts a thrust against the nut 38 and tends to resiliently hold the shank 21 and the head 10 clamped to the flange 26 in the position shown in Fig. 3.

The holder is at rest, as shown in Fig. 3, but, as the die engages the work 42, the holder and the shank 21 may move to the left as viewed in Fig. 3 compressing the spring 40. The spring 40 will return the holder and shank to its at rest position after the work has been completed.

The key is so formed that the forward edge of the sleeve 29 is spaced from the rear surface of the flange 26 in all positions of the holder. Accordingly, a clearance is provided between the rear face of the flange 26 and the forward end of the sleeve 29 to prevent chips discharged from the die through the apertures 43 in the cap 13 from lodging between the flange 26 and the sleeve 29 which would prevent the holder from returning to its normally inactive position as shown in Fig. 3.

Variations and modifications may be made within the scope of this invention and portions of the improvements may be used without others.

I claim:

1. In a die holder of the type described, a head; a seat formed on said head for receiving the base of a die, the plane of said seat being normal to the axis of said head; a cap for holding the base of said die against said seat; means on said cap engaging means on said head for removably mounting said cap on said head and for tightening the base of said die against said seat; and means on said cap cooperating with means on said head for holding said cap mounted on said head with the axis thereof coincident with the axis of said head, the latter pair of means being longitudinally spaced from said pair of mounting means.

2. In a die holder of the type described, a head; a seat formed on said head for receiving the base of a die, the plane of said seat being normal to the axis of said head; a cap having a surface formed internally thereof for engaging a portion of said die to hold the base thereof against said seat; means formed internally of said cap engaging means formed externally of said head for removably securing said cap to said head; and means formed internally of said cap for engaging means formed externally of said head for insuring that said cap when secured to said head will have its axis coincident with the axis of said head, the latter pair of means being longitudinally and radially spaced from said pair of securing means.

3. In a die holder of the type described, a head; a seat formed on said head for receiving the base of a die; a cap for holding said die against said seat; means formed internally of said cap engaging means formed externally of said head for removably mounting said cap on said head, and for tightening the base of said die against said seat; an annular contact surface formed on said head; and an annular contact surface formed interiorly of said cap having a diameter substantially equal to the diameter of the surface of said head, the axis of each surface being parallel to the axis of said head, said surfaces cooperating to insure that the cap when mounted to said head has its axis coincident with the axis of said head, and said annular surfaces being radially and longitudinally spaced from said pair of mounting means.

4. In a die holder of the type described, a head; a seat formed on said head for receiving the base of a die, the plane of said seat being normal to the axis of said head; a cap having a camming surface formed internally of said cap adapted to engage a camming surface formed on said die, movement of said cap onto said head causing the cap to cam the die and hold the base of the die tightly against the seat; means formed internally of said cap engaging means formed externally of said head for removably securing said cap to said head and for effecting movement of said cap on said head in die-holding direction; and means formed internally of said cap for engaging means formed externally of said head for insuring that said cap when secured to said head will have its axis coincident with the axis of said head, the latter pair of means being radially and longitudinally spaced from said pair of securing means.

5. In a die holder of the type described, a head; a seat formed on said head for receiving the base of a die, the plane of said seat being normal to the axis of said head; a cap having a surface formed internally thereof adapted to engage a portion of said die to hold the base thereof against said seat; centering means formed internally of said cap adapted to engage corresponding means formed externally of said head for insuring that said cap when secured to said head will have its axis coincident with the axis of said head; and means for securing the cap to said head, the latter means being longitudinally and radially spaced from said pair of centering means.

6. In a die holder of the type described, a head; a seat formed on said head for receiving the base of a die, the plane of said seat being normal to the axis of said head; a cap having a surface formed internally thereof for engaging a portion of said die to hold the base thereof against said seat; an annular surface formed internally of said cap, said surface being parallel to the axis of said head; an annular surface having a diameter corresponding to the diameter of said first-named surface formed externally of said head, said surfaces engaging and holding the cap against canting when the cap is mounted on said head; and means formed internally of said cap engaging means formed externally of said head for securing said cap on said head and for tightening said die against said seat, the latter pair of means being longitudinally and radially spaced from said annular surfaces.

7. In a die holder of the type described, a head having a seat adapted to receive a die, said seat lying in a plane normal to the axis of said head, said head terminating at one end in a cylindrical surface parallel to the axis of said head and provided with screw threads of greater minimum diameter than said cylindrical surface at the opposite end; a die having a base normal to the axis of the die; an internally threaded cap adapted to be threaded onto said head to hold the base of said die against said seat; and an annular surface, formed internally of said cap, having a diameter corresponding to the diameter of said cylindrical surface and adapted, at a position axially spaced from the engaged threads of said cap and head, to slidably engage and cooperate with said cylindrical surface when the cap is threaded onto said head to hold the cap with the axis thereof aligned with the axis of said head.

8. In a holder of the type described, a die holding head; a shank; means for securing said head to said shank in fixed relative position, said securing means being adjustable for centering the head with the shank; a sleeve slidably receiving said shank; a plurality of concentric annular contact surfaces formed in the bore of said sleeve; a like number of cylindrical contact surfaces formed on the peripheral surface of the shank having diameters corresponding to the diameters of the surfaces formed in the bore of the sleeve, said surfaces cooperating to hold the axis of said shank in alignment with the axis of said sleeve; and means for retaining said shank against rotation relative to said sleeve.

9. In a die holder comprising a shank, a plurality of concentric annular surfaces formed on the peripheral surface of said shank; a sleeve having a plurality of concentric annular surfaces formed in its bore having diameters corresponding to the diameters of the surfaces formed on the peripheral surface of the shank, the shank being disposed in the bore of said sleeve with the surfaces thereof engaging the surfaces formed in the bore of the sleeve; and means for preventing rotational movement of the shank relative to the sleeve, said means comprising a diametrical key carried by said shank, the opposite projecting ends of which have a cross sectional shape of substantially semiovaloid form and received within correspondingly formed slots provided at diametrically opposite points in the bore of said sleeve.

10. In a die holder of the type described, a head; a seat formed on said head lying in a plane perpendicular to the axis of said head; a die presenting an end surface adapted to engage the seat; a cap removably mounted on said head for holding the base of said die against said seat; means on said cap cooperating with means on said head for holding said cap mounted to said head with the axis thereof coincident with the axis of said head; a shank; means for securing the head in fixed position relative to said shank, said means permitting said head to be adjusted in a plane perpendicular to the axis of said shank; a sleeve slidably receiving said shank; means on said shank cooperating with means formed in the bore of said sleeve for aligning said shank relative to an axis coincident with the axis of said sleeve; and means for retaining said shank against rotation relative to said sleeve.

11. In a die holder of the type described, a head having a seat adapted to receive a die, said seat lying in a plane normal to the axis of said head, said head terminating at one end in a cylindrical surface parallel to the axis of said head and provided with screw threads of greater minimum diameter than said cylindrical surface at the opposite end; a die having a base normal to the axis of the die; an internally threaded cap adapted to be threaded onto said head and having an internal cylindrical surface of a diameter corresponding to that of the cylindrical surface of said head, adapted to slidably engage the latter surface at a position axially spaced from the engaged threads of said cap and head to retain the axes of the head and cap in alignment, said cap being formed with an internal surface at the nose thereof adapted to engage a portion of said die to hold the base of said die against said seat, said cap being undercut at the rear thereof to provide a substantially conoidal surface; and a sleeve threaded onto said head having a conical nose adapted to be received within the undercut portion of said cap to lock the cap in a predetermined position on said head, and to assist in retaining the axes of the head and cap in alignment.

12. In a tool of the type described, a die holding head; a shank, said head being coaxially secured to said shank; a sleeve slidably receiving said shank; and a substantially rectangular key having the four edges thereof smoothly rounded, said key being diametrically carried by said shank with the plane of the rectangle parallel to the axis of the shank, and having the oppositely projecting ends slidably received in correspondingly shaped slots diametrically formed in the bore of said sleeve, the walls of said slots snugly engaging the projecting ends of the key.

13. In a tool of the type described, a die holding head; a shank; means for securing said head to said shank in fixed relation, said means being adjustable to permit axial alignment of said head and said shank; a sleeve slidably receiving said shank; and a substantially rectangular key the edges of which are of a substantially ovaloid cross sectional shape, said shank being formed with a diametrical slot shaped to receive said key, the length of said key being such that the ends thereof oppositely project from the peripheral surface of the shank, said oppositely projecting ends being smoothly rounded and received within correspondingly shaped slots provided at diametrically opposite points in the bore of said sleeve.

14. In a die holder of the type described, a head, a seat formed on said head for receiving the base of the die, the plane of said seat being normal to the axis of said head; a cap for holding the base of said die against said seat; means in said cap engaging means on said head for removably mounting said cap on said head, and for tightening the base of said die against the said seat; and means on said cap cooperating with means on said head for holding said cap mounted on said head, with the axis thereof coincident with the axis of said head, the latter pair of means being radially spaced from said pair of moutnng means.

15. In a tool of the type described, a die-holding head; a shank, said head being coaxially secured to said shank; a sleeve slidably receiving said shank; and means for preventing rotational movement of the shank relative to the sleeve, said means comprising a diametrical key carried by said shank, the opposite projecting ends of which have a cross-sectional shape of substantially semiovaloid form and received within correspondingly formed slots provided at diametrically opposite points in the bore of said sleeve.

GEORGE H. COTE.